(12) United States Patent
Traphagan et al.

(10) Patent No.: US 10,518,118 B2
(45) Date of Patent: Dec. 31, 2019

(54) FIRE HYDRANT ASSEMBLY

(71) Applicant: Trakker Industries, LLC, Spring Creek, NV (US)

(72) Inventors: Thomas Todd Traphagan, Spring Creek, NV (US); Cody James Bakker, Spring Creek, NV (US)

(73) Assignee: Trakker Industries, LLC, Spring Creek, NV (US)

( * ) Notice: Subject to any disclaimer, the term of this patent is extended or adjusted under 35 U.S.C. 154(b) by 0 days.

(21) Appl. No.: 16/293,934

(22) Filed: Mar. 6, 2019

(65) Prior Publication Data

US 2019/0282844 A1 Sep. 19, 2019

Related U.S. Application Data

(60) Provisional application No. 62/644,592, filed on Mar. 19, 2018.

(51) Int. Cl.
*E02B 1/02* (2006.01)
*E02B 13/00* (2006.01)
(Continued)

(52) U.S. Cl.
CPC .............. *A62C 35/20* (2013.01); *A01G 25/02* (2013.01); *F16L 21/045* (2013.01); *F16L 21/08* (2013.01);
(Continued)

(58) Field of Classification Search
CPC ......... Y10T 137/5327; Y10T 137/5409; A62C 35/20; F16L 21/04; E02B 13/02
See application file for complete search history.

(56) References Cited

U.S. PATENT DOCUMENTS 2,051,919 A * 8/1936 Tow .................. E02B 13/02
137/321
3,752,179 A 8/1973 Atkins et al.
(Continued)

FOREIGN PATENT DOCUMENTS

AU 695100 B2 8/1998
WO 2005019541 A2 3/2005

OTHER PUBLICATIONS

PCT International Search Report and Written Opinion, PCT/US2019/021090, dated May 15, 2019, 13 pages.

*Primary Examiner* — Eric Keasel
*Assistant Examiner* — Kevin R Barss
(74) *Attorney, Agent, or Firm* — Fennemore Craig, P.C.

(57) ABSTRACT

A fire hydrant assembly for use with an irrigation riser stub may include a generally cylindrically-shaped main body having an open end and a closed end. The open end of the main body has an inside diameter that is sized to slidably receive an end portion of the irrigation riser stub. A seal disposed within the open end of the main body is sized to sealingly engage the irrigation riser stub. A nipple having a threaded end and a plain end is mounted within an opening provided in a side portion of the main body so that the threaded end may be threaded onto a fire hose assembly. An actuator shaft extends through a shaft opening defined by the closed end of the main body so that a head end of the actuator shaft is disposed outside the main body and so that a distal end of the actuator shaft is disposed within an interior cavity defined by the main body. A yoke mounted to the distal end of the actuator shaft is sized to operatively engage a valve stem associated with the irrigation riser stub.

14 Claims, 4 Drawing Sheets

(51) Int. Cl.
*E03B 9/02* (2006.01)
*E03B 9/00* (2006.01)
*A62C 35/20* (2006.01)
*F16L 21/08* (2006.01)
*F16L 21/04* (2006.01)
*A01G 25/02* (2006.01)
*E02B 13/02* (2006.01)

(52) U.S. Cl.
CPC ......... *E02B 13/02* (2013.01); *Y10T 137/5327* (2015.04); *Y10T 137/5409* (2015.04)

(56) References Cited

U.S. PATENT DOCUMENTS

| | | |
|---|---|---|
| 3,854,759 A | 12/1974 | Cornelius |
| 5,059,064 A | 10/1991 | Justice |
| 5,531,243 A * | 7/1996 | Broussard .............. A01G 25/16 137/315.17 |
| 5,803,110 A | 9/1998 | Segal |
| 6,105,603 A | 8/2000 | Alford |
| 7,000,897 B2 | 2/2006 | Chick |
| 7,509,970 B2 | 3/2009 | Garcia et al. |
| 2010/0181388 A1 | 7/2010 | Harrington |

* cited by examiner

FIRE HYDRANT ASSEMBLY

CROSS-REFERENCE TO RELATED APPLICATION

This application claims the benefit of U.S. Provisional Patent Application No. 62/644,592, filed on Mar. 19, 2018, which is hereby incorporated herein by reference for all that it discloses.

TECHNICAL FIELD

The present invention relates to fire hydrant systems in general and more specifically to fire hydrants for use with agricultural irrigation systems.

BACKGROUND

Firefighters are often required to fight fires in remote areas that are not provided with municipal water supply services. While most fire trucks are provided with internal water supply tanks, the tanks are of limited size and can only provide a relatively small amount of water before needing to be refilled. When fighting fires in remote areas, separate supplies of water must be trucked the site of the fire. Alternatively, the fire trucks themselves must be driven to a suitable supply of water which is often located a significant distance from the fire site. Of course, both of these factors can seriously impair the ability to effectively fight fires in remote areas.

SUMMARY OF THE INVENTION

One embodiment of a fire hydrant assembly for use with an irrigation riser stub may include a generally cylindrically-shaped main body having an open end and a closed end. The open end of the main body has an inside diameter that is sized to slidably receive an end portion of the irrigation riser stub. A seal disposed within the open end of the main body is sized to sealingly engage the end portion of the irrigation riser stub. A nipple having a threaded end and a plain end is mounted within an opening provided in a side portion of the main body so that the threaded end may receive a fire hose assembly. An actuator shaft extends through a shaft opening defined by the closed end of the main body so that a head end of the actuator shaft is disposed outside the main body and so that a distal end of the actuator shaft is disposed within an interior cavity defined by the main body. A yoke mounted to the distal end of the actuator shaft is sized to operatively engage a valve stem associated with the irrigation riser stub.

Also disclosed is a method of supplying fire fighting equipment with water from an irrigation riser stub that includes the steps of: Engaging the fire hydrant assembly with the irrigation riser stub; positioning a clamp over a flange provided on the inlet end of the main body and a bead provided on the irrigation riser stub; securing the clamp around the flange and bead; threading a fire hose onto the threaded portion of the outlet end of said main body; and operating the valve actuator on the fire hydrant assembly to operate the valve stem of the irrigation riser and initiate a flow of water through the fire hydrant assembly and into the fire hose.

Also disclosed is a fire hydrant assembly that includes a main body having an inlet end and an outlet end. The inlet end of the main body is configured to slidably receive an end portion of an irrigation riser stub. The outlet end of the main body includes a male threaded portion that is sized to receive a female threaded portion of a fire hose assembly. A clamp assembly operatively associated with the inlet end of the main body assembly is sized to releasably engage a bead provided on the irrigation riser stub. A valve actuator mounted to the main body operatively engages a valve stem on the irrigation riser stub when the hydrant assembly is mounted to the irrigation riser stub.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
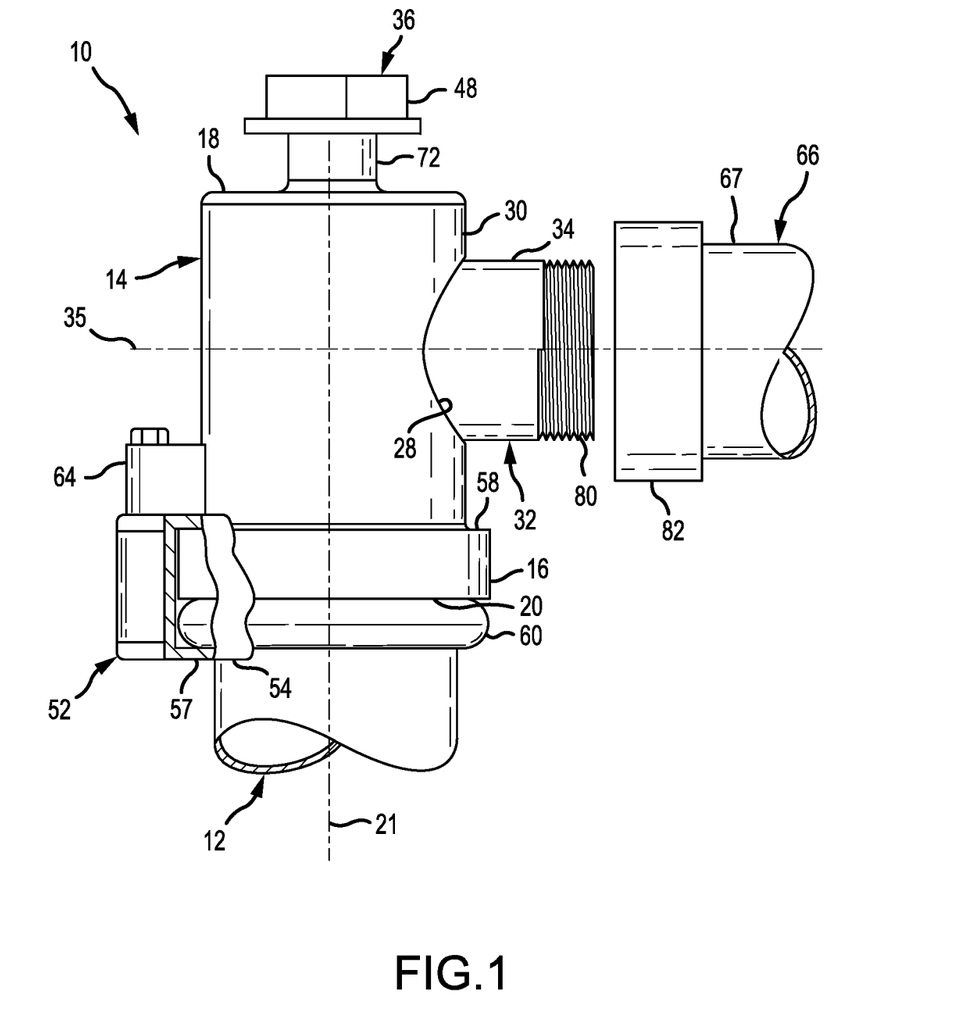
FIG. 1 is a side view in elevation of one embodiment of a fire hydrant assembly shown engaged with a portion of an irrigation riser stub.
Figure 2:
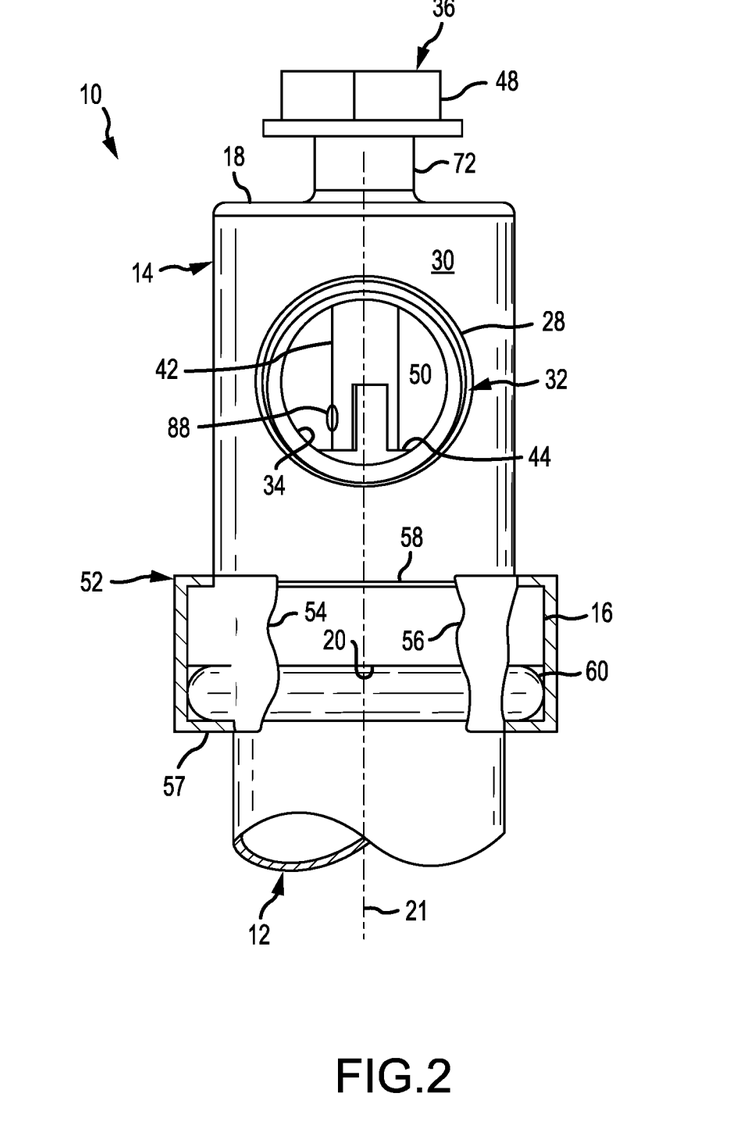
FIG. 2 is a front view in elevation of the fire hydrant assembly illustrated in FIG. 1 showing the internal arrangement of the actuator shaft and yoke.
Figure 3:
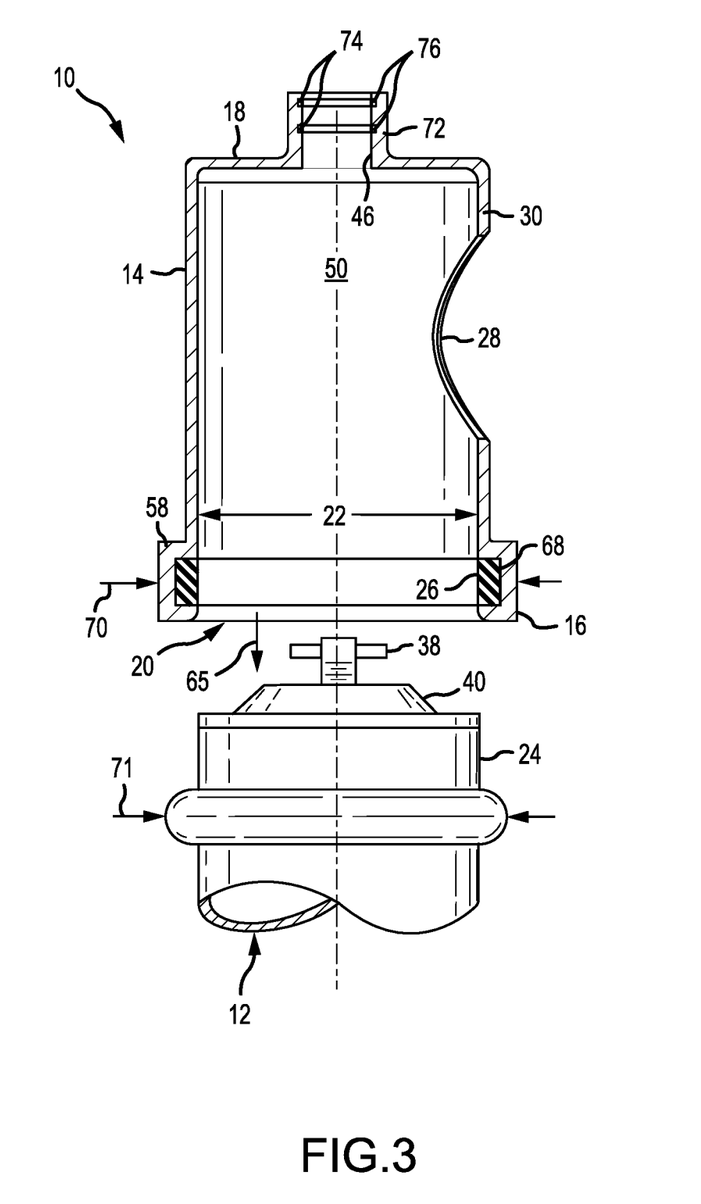
FIG. 3 is a cross-sectional side view in elevation of the fire hydrant assembly illustrated in FIG. 1 showing the arrangements of the riser stub seal and actuator shaft seals.

One embodiment of a fire hydrant assembly 10 according to the present invention is best seen in FIGS. 1-3 as it could be used in conjunction with an irrigation riser stub 12 of the type commonly used in farm-type or agricultural irrigation systems. When engaged with the riser stub 12, the fire hydrant assembly 10 allows water from the irrigation system to be delivered directly to a fire truck or other fire fighting system. In the particular embodiment shown and described herein, the fire hydrant assembly 10 may comprise a generally cylindrically-shaped main body 14 having an open end 16 and a closed end 18. Open end 16 of main body 14 defines a water inlet 20 and is sized to slidably receive an end portion 24 of irrigation riser stub 12. See FIG. 3. Open end 16 of main body 14 may be provided with a seal 26 that is sized to sealingly engage the end portion 24 of riser stub 12. Main body 14 of fire hydrant assembly 10 may also define a water outlet 34. In one embodiment, water outlet 34 is formed by a nipple 32 extending from main body 14. As will be described in further detail below, nipple 32 is sized to receive a fire hose assembly 66.

Fire hydrant assembly 10 may also comprise a valve actuator 36. Valve actuator 36 is configured to operatively engage a valve stem 38 (FIG. 3) provided on the irrigation riser stub 12. As will be described in greater detail herein, valve actuator 36 of fire hydrant assembly 10 may be used to rotate valve stem 38 on irrigation riser stub 12 in order to initiate and terminate a flow of water.

Figure 5:
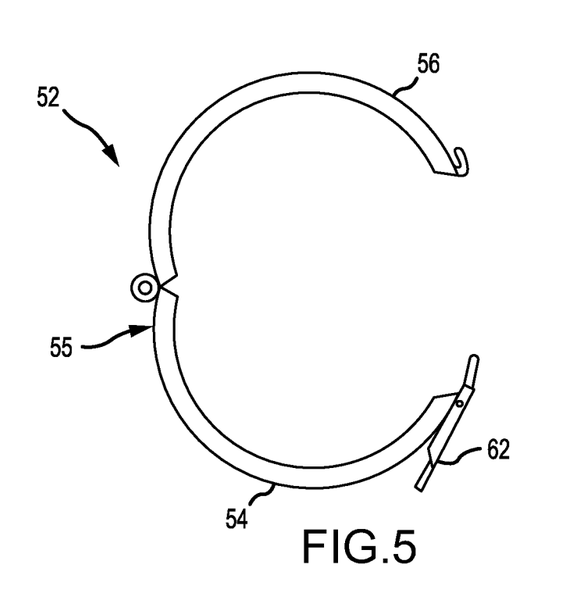
FIG. 5 is a plan view of one embodiment of a clamp assembly that may be used to secure the fire hydrant assembly to the irrigation riser stub.

Referring now primarily to FIGS. 1, 2, and 5, fire hydrant assembly 10 may also include a clamp assembly 52. Clamp assembly 52 may be used to removably secure fire hydrant assembly 10 to the irrigation riser stub 12. In one embodiment, clamp assembly 52 may comprise a pair of shells 54 and 56 that are pivotally mounted to one another so that they may be moved between an opened position 55, shown in FIG. 5, and a closed position 57, shown in FIGS. 1 and 2. The shells 54 and 56 of clamp assembly 52 are sized to engage a flange 58 provided on open end 16 of main body 12 and a bead 60 provided on irrigation riser stub 12. The two shells 54 and 56 of clamp assembly 52 may be secured in the closed position 57 by means of a latch 62.

The fire hydrant assembly 10 may be used as follows to supply a fire truck or other firefighting equipment (not shown) with water from a farm-type or agricultural irrigation system. In a first step, the fire hydrant assembly 10 is engaged with the irrigation riser stub 12. The engagement may be accomplished by sliding the open end 16 of main body 14 over the end portion 24 of irrigation riser assembly 12, i.e., in the direction of arrow 65 (FIG. 3), until the flange 58 of main body 14 abuts the bead 60 provided on irrigation riser assembly 12. Thereafter, the two shells 54 and 56 of clamp assembly 52 may be closed over the flange 58 and bead 60, as best seen in FIGS. 1 and 2. Latch 62 may then be engaged to secure clamp assembly 52 in the closed position 57. The engagement of the clamp assembly 52 with the flange and bead 58 and 60 prevents relative axial movement between the fire hydrant assembly 10 and irrigation riser stub 12, thereby firmly securing the two together. Fire hose assembly 66 may be secured to the water outlet 34 of fire hydrant assembly 10. Thereafter, valve actuator 36 may be operated (e.g., by turning the head 48 of actuator shaft 42) to rotate valve stem 38 on irrigation riser stub 12 and thereby initiate a flow of water into the fire hydrant assembly 10.

When water from the irrigation system is no longer needed, the valve actuator 36 may be operated to close valve stem 38 and terminate the flow of water. The clamp assembly 52 may thereafter be released or loosened and the fire hydrant assembly 10 removed from the irrigation riser stub 12.

A significant advantage of the fire hydrant assembly of present invention is that it allows fire fighting equipment to be readily connected to agricultural irrigation systems and thereby obtain access to water sources that were previously unavailable to such equipment. Moreover, because most agricultural irrigation systems are located in remote areas, the fire hydrant assembly allows fire fighting equipment to access ample supplies of water where it is needed most—in remote firefighting operations. The fire hydrant assembly 10 is also easy to use and can be readily connected to irrigation riser valves, typically in a matter of seconds, and without requiring any special tools.

Other advantages are associated with the valve actuator assembly. Namely, the valve actuator assembly allows the irrigation riser stub valve to be easily operated after the fire hydrant assembly has been secured to the riser stub. Moreover, the valve actuator assembly can be operated with the same tool (e.g., a hydrant wrench) that fire fighters use to operate conventional municipal-type fire hydrants. There is no need for a special stub valve wrench. Still yet other advantages are associated with the nipple provided on the water outlet end of the fire hydrant assembly. The nipple is specially sized and configured to interface with conventional fire hose assemblies without the need for any special adapters or couplers. Additional advantages are associated with embodiments wherein the clamp assembly is mounted to the main body of the fire hydrant assembly. In such embodiments, there is no need to provide a separate clamp assembly. The fire hydrant assembly is completely self-contained, requiring only the use of a hydrant wrench to open and close the irrigation riser valve to initiate and terminate the flow of water.

Having briefly described certain embodiments of the fire hydrant assembly of the present invention, as well as some of their more significant features and advantages, various exemplary embodiments and variations of the present invention will now be described in detail. However, before proceeding the description, it should be noted that while various embodiments are shown and described herein as they could be used in conjunction with standard 4-inch riser stub valves of the type commonly used in agricultural irrigation systems, the present invention could be used with other types of irrigation riser valves of other sizes. Consequently, the present invention should not be regarded as limited to use with any particular type or size of irrigation riser stub.

Referring back now to FIGS. 1-3, the fire hydrant assembly 10 according to one embodiment of the present invention may comprise a generally cylindrically-shaped main body 12 having an open end 16, a closed end 18, and defining an interior cavity 50 therein. The open end 16 of main body 14 forms a water inlet end 20 having an inside diameter 22 that is sized to slidably receive an end portion 24 of irrigation riser stub 12. In this regard it should be noted that irrigation riser stubs 12 may be provided in a wide variety of sizes and styles. Therefore, the open end 16 of main body 14 should be sized and configured to mate with the particular type of irrigation riser stub 12 that is expected to be encountered. By way of example, in an embodiment that is configured to be used with standard 4-inch (about 10.2 cm) irrigation riser stubs, the inside diameter 22 of open end 16 may be about 4.22 inches (about 10.72 cm).

Open end 16 of main body 14 may also be provided with seal 26 suitable for providing sealing engagement with the end portion 24 of irrigation riser stub 12. Seal 26 may be received by a groove 68 provided in the open end 16 of main body 14, as best seen in FIG. 3. Seal 26 may be fabricated from any of a wide range of materials now known in the art or that may be available in the future that would be suitable for the particular type of irrigation stubs expected to be encountered. Consequently, the present invention should not be regarded as limited to seals 26 fabricated from any particular type of material. However, by way of example, in one embodiment seal 26 may be fabricated from butyl rubber.

Open end 16 of main body 14 may also be provided with a flange 58 that is positioned to abut the bead 60 formed on the irrigation riser stub 12 when the fire hydrant assembly 10 is fully engaged with the irrigation riser stub 12. See FIGS. 1 and 2. Moreover, it is generally preferred, but not required, that flange 58 be sized so that an outside diameter 70 thereof is about equal to an outside diameter 71 of the bead 60. In an embodiment wherein the fire hydrant assembly 10 is configured for use with 4 inch (about 10.2 cm) irrigation riser stub 12, the outside diameter 70 of flange 58 may be about 5.34 inches (about 13.56 cm), which is about the same as the outside diameter 71 of the bead 60.

Referring now primarily to FIG. 3, the closed end 18 of main body 14 is configured to receive the valve actuator 36. In one embodiment, the closed end 18 of main body 14 may include a raised bonnet 72. Raised bonnet 72 provides increased lateral support for actuator shave 42 and defines an opening or bore 46 therein that is sized to receive actuator shaft 42. Bonnet 72 may be provided with one or more shaft seals 74 provided within corresponding grooves 76. Shaft seals 74 serve to prevent water in the interior cavity 50 of main body 14 from leaking past the actuator shaft 42. Shaft seals 74 may be fabricated from any of a wide range of materials. By way of example, in one embodiment, shaft seals 74 are fabricated from butyl rubber.

Fire hydrant assembly 10 is also provided with a water outlet 34. In one embodiment, water outlet 34 is formed by a nipple 32 mounted within an opening 28 formed in a side portion 30 of main body 14. Thus, water outlet 34 extends along a water outlet axis 35 that is substantially perpendicular to a water inlet axis 21 of water inlet 22. See FIG. 1. Alternatively, other orientations of the water inlet and outlet axes 21 and 35 are possible, as would become apparent to persons having ordinary skill in the art. Consequently, the present invention should not be regarded as limited to embodiments wherein the outer outlet axis 35 is perpendicular to the water inlet axis 21.

In one embodiment, a plain end 78 of nipple 32 is welded to opening 28, although other arrangements are possible. For example, in another embodiment the nipple 32 could comprise a press-fit into opening 28. In still yet another arrangement, nipple 32 could be threaded into opening 28. In any event, and regardless of how the nipple 32 is secured to the opening 28 provided in main body 14, nipple 32 may also comprise a threaded end 80 that is sized to receive a threaded coupler 82 provided on the proximal end 67 of fire hose assembly 66. In this regard it should be noted that the threaded end 80 of nipple 32 should be sized to interface with the particular type of fire hose assembly that is expected to be used. Therefore, nipple 32 could comprise male threads, female threads, or some other type of coupling arrangement, again depending on the particular type of fire hose assembly 66.

By way of example, in one embodiment, nipple 32 may be configured to engage female threaded fire hose couplings having a Nominal Pipe Size (NPS) of 2.5 inches (about 6.35 cm). Nipple 32 may have an inside diameter of about 2.5 inches (about 6.35 cm) and an outside diameter of about 3.07 inches (about 7.8 cm). The threaded end 80 of nipple 32 may be provided with male threads conforming to the 2.5 inch National Standard Thread (NST) standard, which will allow it to be threadingly engaged with standard 2.5 inch fire hose couplings (e.g., coupler 82) having female threads.

Main body 14 may be fabricated from any of a wide range materials, such as metals or metal alloys, that are well-known in the art and that would be suitable for such purposes. Consequently, the main body 14 of fire hydrant assembly 10 should not be regarded as limited to any particular type of materials. However, by way of example, in one embodiment, main body 14 is fabricated from type 6061 aluminum alloy. Nipple 32 may be fabricated from the same material as the main body 14 to permit easy welding of the nipple 32 to main body 14.

Figure 4:
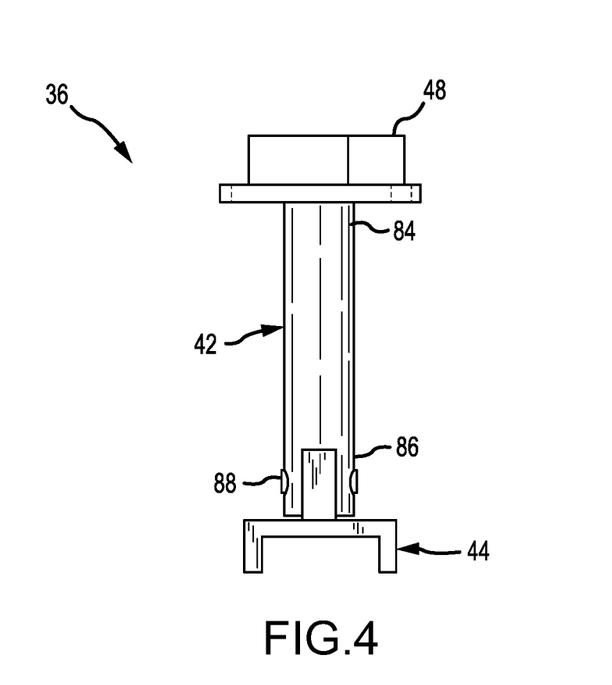
FIG. 4 is a side view in elevation of one embodiment of an actuator shaft and yoke assembly.

Fire hydrant assembly 10 may also comprise a valve actuator 36. As described earlier, valve actuator 36 is configured to engage the valve stem 38 provided on irrigation riser stub 12. In one embodiment, valve actuator 36 may comprise an actuator shaft 42 and a yoke 44. See FIG. 4. A proximal end 84 of actuator shaft 42 may terminate in a head 48 that is sized and configured to be operated by a suitable wrench (not shown). Because fire hydrant assembly 10 will be commonly used by firefighters, the head 48 of actuator shaft 42 may comprise a 5-sided head of the same size as that typically used on municipal-type fire hydrants. If so, the valve actuator 36 of fire hydrant assembly 10 may be operated by a conventional fire hydrant wrench. Yoke 44 may comprise a U-shaped configuration sized to engage the T-shaped valve stem 38 provided on the irrigation riser stub 12. In one embodiment, yoke 44 is pivotally mounted (e.g., by means of a roll pin 88) to a distal end 86 of actuator shaft 42, as best seen in FIG. 4. The pivotal mounting arrangement allows some amount of relative movement of actuator shaft 42 and yoke 44, thereby ensuring easy and reliable engagement of the yoke 44 with the valve stem 38.

Actuator shaft 42 and yoke 44 may be made from any of a wide range of materials, such as metals or metal alloys. It is generally preferred that the particular material be corrosion-resistant, although the use of corrosion-resistant materials is not required. By way of example, in one embodiment, actuator shaft 42 and yoke 44 are fabricated from type 17-4 stainless steel.

Fire hydrant assembly 10 may also be provided with a clamp assembly 52 to allow the fire hydrant assembly 10 to be releasably secured to the irrigation riser stub 12. Clamp assembly 52 is best seen in FIGS. 1, 2, and 5 and may comprise a pair of semi-circular shells 54 and 56 that are pivotally mounted to one another so that they may be moved between an opened position 55 (illustrated in FIG. 5) and a closed position 57 (illustrated in FIGS. 1 and 2). Each shell 54, 56 may be provided with a generally U-shaped cross-section that is sized to closely receive the flange 58 and bead 60 when the fire hydrant assembly 10 is fully engaged with the irrigation riser stub 12. Clamp assembly 52 may also be provided with a latch assembly 62 to secure the two shells 54 and 56 in the closed position 57. In one embodiment, clamp assembly 52 is secured to a mounting boss 64 provided on main body 14, as best seen in FIG. 1. So mounting the clamp assembly 52 to the main body 14 will allow the clamp assembly 52 to be carried along with the fire hydrant assembly 10, thereby eliminating the requirement to provide a separate clamp assembly.

Clamp assembly 52 may be fabricated from any of a wide range of materials, preferably corrosion-resistant materials, although the use of corrosion-resistant materials is not required. By way of example, in one embodiment, clamp assembly 52 is fabricated from galvanized steel.

As described earlier, the fire hydrant assembly 10 may be operated as follows to supply a fire truck or other firefighting equipment (not shown) with water from a farm-type or agricultural irrigation system. The fire hydrant assembly 10 first may be engaged with the irrigation riser stub 12 by sliding the open end 16 of main body 14 over the end portion 24 of irrigation riser assembly 12, i.e., in the direction of arrow 65 (FIG. 3), until the flange 58 of main body 14 abuts the bead 60 provided on irrigation riser assembly 12. See FIGS. 1 and 2. At this point, the yoke 44 will be engaged with the valve stem 38 provided on the irrigation riser stub 12. If not, the user (not shown) may rotate the actuator shaft 42 slightly to ensure engagement. Thereafter, the two shells 54 and 56 of clamp assembly 52 may be closed over the flange 58 and bead 60 and secured with the latch 62, thereby firmly attaching the fire hydrant assembly 10 to the irrigation riser stub 12. A fire hose 66 may then be attached to the fire hydrant assembly 10 by threading the coupler 82 thereof onto the threaded end 80 of nipple 32. The distal end (not shown) of fire hose 66 may be connected to the fire truck or other firefighting equipment (also not shown), as required. Valve actuator 36 then may be operated by turning the head 48 of actuator shaft 42. The rotation of the actuator shaft 42 will cause yoke 44 to rotate the valve stem 38 provided on irrigation riser stub 12. The rotating valve stem 38 will in turn lift a valve disk 40 provided on the irrigation riser stub 12 to initiate the flow of water.

When water from the irrigation system is no longer needed, the valve actuator 36 of fire hydrant assembly 10 may be operated to turn valve stem 38, lowering the valve disk 40 and terminating the flow of water. The clamp assembly 52 may thereafter be released or loosened and the fire hydrant assembly 10 removed from the irrigation riser stub 12.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A fire hydrant assembly for use with an irrigation riser stub, comprising:
    a generally cylindrically-shaped main body defining an interior cavity, an open end, a closed end, and an opening in a side portion thereof, the open end of said main body defining an inlet having an inside diameter that is sized to slidably receive the irrigation riser stub, wherein the inlet of said main body defines a flange thereon sized and positioned to abut a bead provided on the irrigation riser stub when said fire hydrant assembly is engaged with the irrigation riser stub;
    a seal disposed within the inlet of said main body, said seal being sized to sealingly engage the irrigation riser stub when the inlet of said main body receives the irrigation riser stub;
    a nipple having a threaded end and a plain end, the plain end of said nipple being mounted over the opening in the side portion of said main body, the threaded end of said nipple being sized to threadingly engage a fire hose assembly;
    an actuator shaft having an proximal end and a distal end, the proximal end of said actuator shaft defining a head portion, said actuator shaft extending through a shaft opening defined by the closed end of said main body so that the proximal end of said actuator shaft is disposed outside said main body and so that the distal end of said actuator shaft is disposed within the interior cavity defined by said main body; and
    a yoke mounted to the distal end of said actuator shaft, said yoke being sized to operatively engage a valve stem associated with the irrigation riser stub.

2. The fire hydrant assembly of claim 1, wherein the threaded end of said nipple comprises male threads.

3. The fire hydrant assembly of claim 1, wherein the closed end of said main body defines a bonnet defining a central opening therein that is aligned with the shaft opening defined by the closed end of said main body, the central opening defined by the bonnet being sized to receive said actuator shaft, said fire hydrant assembly further comprising:
    a first shaft seal disposed at a first position within the central opening defined by the bonnet, said first shaft seal being sized to sealingly engage said actuator shaft; and
    a second shaft seal disposed at a second position within the central opening defined by the bonnet, said second shaft seal being sized to sealingly engage said actuator shaft.

4. The fire hydrant assembly of claim 1, further comprising a clamp assembly sized to engage the flange on said main body and the bead provided on the irrigation riser stub when said fire hydrant assembly is engaged with the irrigation riser stub, said clamp preventing axial movement of said fire hydrant assembly with respect to the irrigation riser stub.

5. The fire hydrant assembly of claim 4, wherein said main body defines a mounting boss thereon and wherein said clamp is pivotally mounted to said mounting boss.

6. The fire hydrant assembly of claim 1, wherein said main body and said nipple comprise an aluminum alloy.

7. The fire hydrant assembly of claim 6, wherein said aluminum alloy comprises type 6061 aluminum alloy.

8. The fire hydrant assembly of claim 1, wherein said actuator shaft and said yoke comprise stainless steel.

9. The fire hydrant assembly of claim 8, wherein said stainless steel comprises type 17-4 stainless steel.

10. A fire hydrant assembly for use with an irrigation riser stub, comprising:
    a generally cylindrically-shaped main body defining an interior cavity, an open end, a closed end, and an opening in a side portion thereof, the open end of said main body defining an inlet having an inside diameter that is sized to slidably receive the irrigation riser stub;
    a seal disposed within the inlet of said main body, said seal being sized to sealingly engage the irrigation riser stub when the inlet of said main body receives the irrigation riser stub;
    a nipple having a threaded end and a plain end, the plain end of said nipple being mounted over the opening in the side Portion of said main body, the threaded end of said nipple being sized to threadingly engage a fire hose assembly;
    an actuator shaft having an proximal end and a distal end, the proximal end of said actuator shaft defining 5-sided head, said actuator shaft extending through a shaft opening defined by the closed end of said main body so that the proximal end of said actuator shaft is disposed outside said main body and so that the distal end of said actuator shaft is disposed within the interior cavity defined by said main body; and
    a yoke mounted to the distal end of said actuator shaft, said yoke being sized to operatively engage a valve stem associated with the irrigation riser stub.

11. A method of supplying fire fighting equipment with water from an irrigation system, the irrigation system including at least one irrigation riser stub, comprising:
    engaging a fire hydrant assembly with the irrigation riser stub, the fire hydrant assembly comprising:
        a main body having an inlet end and an outlet end, the inlet end of the main body being configured to slidably receive the irrigation riser stub, the inlet end of the main body also defining a flange thereon that is sized and spaced to abut a bead provided on the irrigation riser stub when the fire hydrant assembly is engaged with the irrigation riser stub, the outlet end of the main body comprising a threaded portion thereon; and
        a valve actuator operatively associated with the main body of the fire hydrant assembly, the valve actuator operatively engaging a valve stem provided on the irrigation riser stub when the fire hydrant assembly is engaged with the irrigation riser stub;
    positioning a clamp over the flange provided on the inlet end of the main body and the bead provided on the irrigation riser stub;
    securing the clamp around the flange and bead;
    threading a fire hose onto the threaded portion of the outlet end of said main body; and
    operating the valve actuator on the fire hydrant assembly to operate the valve stem of the irrigation riser and initiate a flow of water through the fire hydrant assembly and into the fire hose.

12. The method of claim 11, further comprising operating the valve actuator on the hydrant assembly to operate the valve stem of the irrigation riser to terminate the flow of water.

13. The method of claim 12, further comprising:
  releasing the clamp from the flange and bead; and
  removing the fire hydrant assembly from the irrigation riser stub.

14. A fire hydrant assembly for use with an irrigation riser stub, comprising:
  a main body defining an interior cavity therein, said main body having an inlet end and an outlet end, the inlet end of said main body being configured to slidably receive the irrigation riser stub, the outlet end of said main body comprising a male threaded portion sized to receive a female threaded portion of a fire hose assembly, wherein the inlet end and outlet end of said main body extend along respective inlet end and outlet end axes that are substantially perpendicular to one another;
  a clamp assembly operatively associated with the inlet end of said main body assembly, said clamp assembly being sized to releasably engage a bead provided on the irrigation riser stub when the fire hydrant assembly is mounted to the irrigation riser stub;
  a valve actuator mounted to said main body, said valve actuator comprising:
    an actuator shaft having a proximal end and a distal end, the proximal end of said actuator shaft comprising a 5-sided head disposed outside said main body and wherein the distal end of said actuator shaft is disposed within the interior cavity defined by said main body; and
    a yoke mounted to the distal end of said actuator shaft, said yoke being sized to engage the valve stem of the irrigation riser stub when said hydrant assembly is mounted to the irrigation riser stub.

\* \* \* \* \*